United States Patent
Procida et al.

(10) Patent No.: US 6,681,832 B1
(45) Date of Patent: Jan. 27, 2004

(54) WINDOW SCREEN ASSEMBLY FOR VEHICLE

(76) Inventors: Carla Procida, 148 Udall Rd., West Islip, NY (US) 11795-2322; Craig R. Procida, 148 Udall Rd., West Islip, NY (US) 11795-2322

( * ) Notice: Subject to any disclaimer, the term of this patent is extended or adjusted under 35 U.S.C. 154(b) by 0 days.

(21) Appl. No.: 10/185,962

(22) Filed: Jul. 1, 2002

(51) Int. Cl.⁷ .................................................. B60J 1/08
(52) U.S. Cl. .................................. 160/370.22; 296/97.8
(58) Field of Search .................. 160/370.22, 23.1, 160/24, 290.1; 296/97.8

(56) References Cited

U.S. PATENT DOCUMENTS

| | | | |
|---|---|---|---|
| 1,483,652 A | | 2/1924 | Donigan |
| 2,223,477 A | | 12/1940 | Bernier |
| 2,665,754 A | | 1/1954 | Claussen et al. |
| 2,804,135 A | | 8/1957 | Sutton |
| 2,850,087 A | | 9/1958 | Janaman |
| 2,881,831 A | | 4/1959 | Knodel, Jr. |
| 4,335,773 A | * | 6/1982 | Masi ........................ 160/23.1 |
| 4,442,881 A | * | 4/1984 | Monteath et al. .......... 296/97.8 |
| 4,463,790 A | | 8/1984 | Clapsaddle |
| 4,707,018 A | * | 11/1987 | Gavagan .................... 296/97.8 |
| 4,799,422 A | | 1/1989 | Birt |
| 4,823,859 A | * | 4/1989 | Park ....................... 160/370.22 |
| 5,014,607 A | | 5/1991 | Johnson |
| 5,089,912 A | * | 2/1992 | Simin ........................ 296/97.8 |
| 5,094,151 A | | 3/1992 | Bernard |
| 5,605,370 A | * | 2/1997 | Ruiz ..................... 160/370.22 |
| 6,039,107 A | * | 3/2000 | Pittard .................. 160/370.22 |
| 6,079,474 A | * | 6/2000 | Lin ....................... 160/370.22 |
| 6,170,553 B1 | * | 1/2001 | Villarreal-Chavez ... 160/370.22 |

* cited by examiner

*Primary Examiner*—David Purol
(74) *Attorney, Agent, or Firm*—Donald R. Schoonover

(57) ABSTRACT

A window screen is stored in a housing that is mounted on a door of a vehicle adjacent to a window opening defined in that door. The screen has a flexible body with hook-and-loop fastening material thereon. Corresponding hook-and-loop fastening material is located on the vehicle adjacent to the window opening. When it is desired to use the window screen, the flexible body is pulled out of the housing and releasably attached, via the hook-and-loop materials, to the vehicle in covering relationship with the window opening. When not in use, the flexible body is stored in the housing.

5 Claims, 2 Drawing Sheets

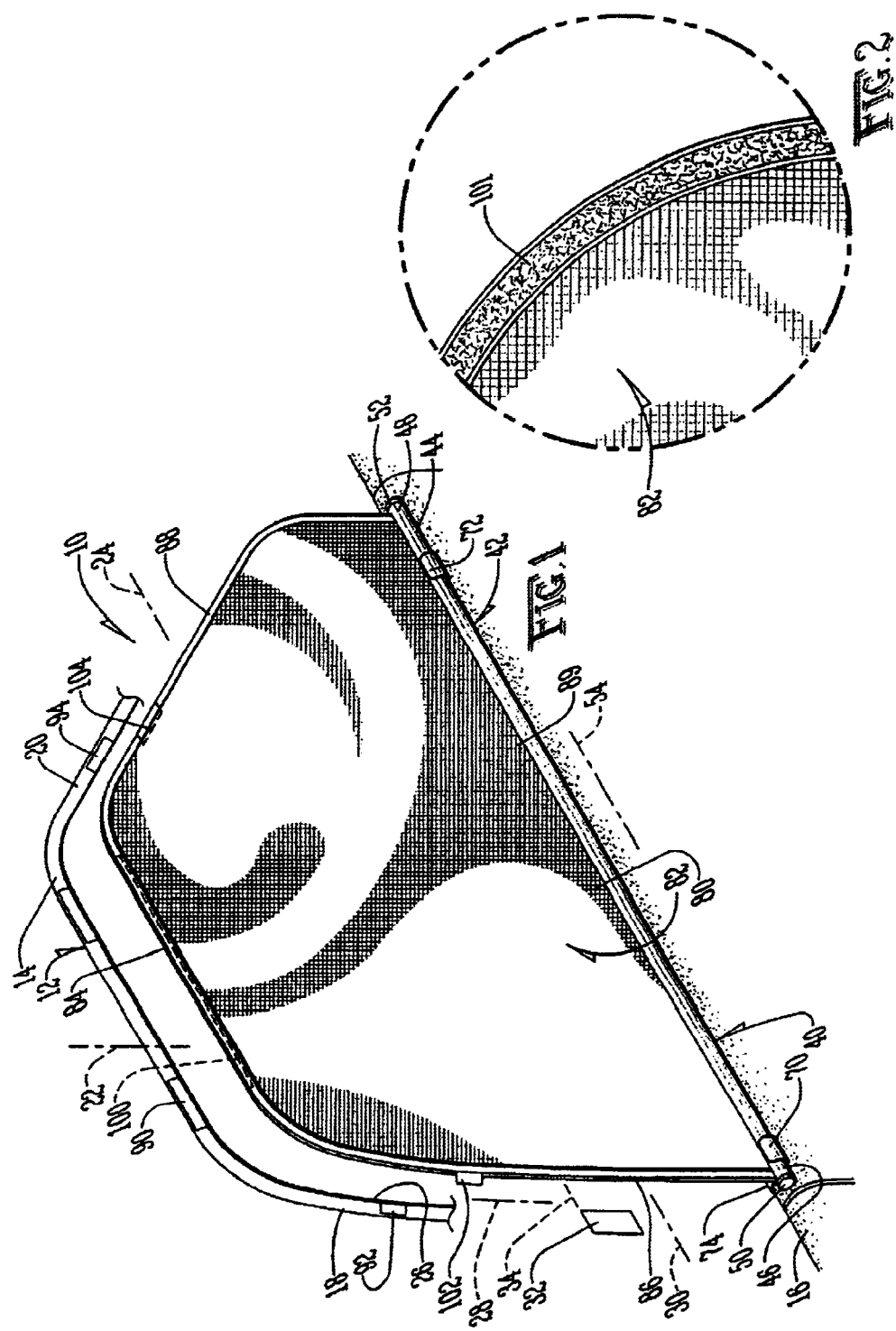

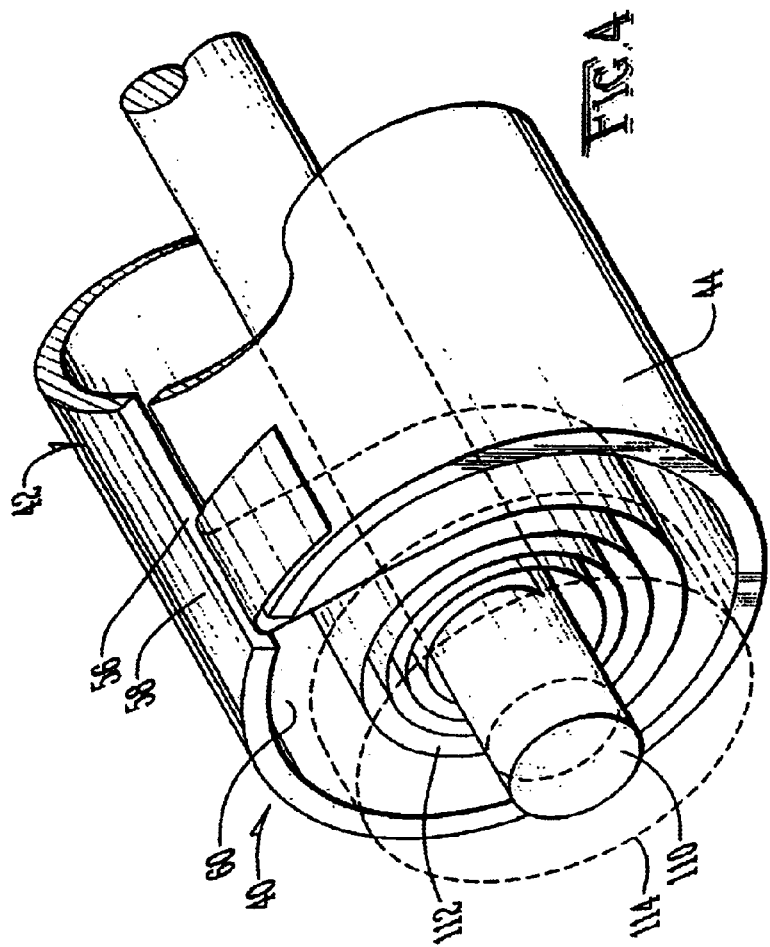
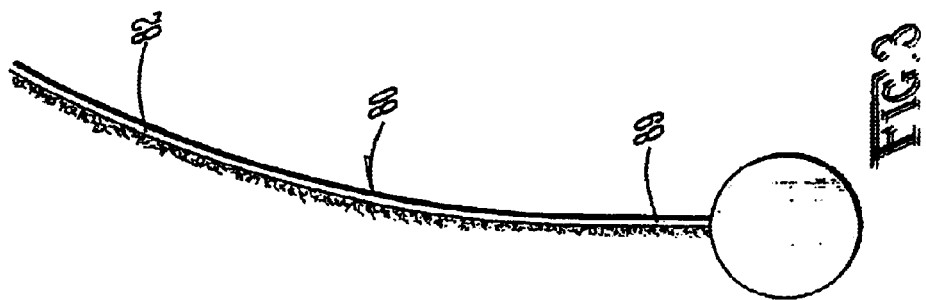

WINDOW SCREEN ASSEMBLY FOR VEHICLE

BACKGROUND OF THE INVENTION

1. Field of the Invention

The present invention relates to the general art of motor vehicles, and to the particular field of accessories for motor vehicles, especially window accessories.

2. Discussion of the Related Art

All automobiles have windows that can be opened to permit access to the interior of the passenger compartment of the automobile. One of the joys of riding in an automobile is the fresh air that flows into the vehicle as that vehicle is driven. Passengers often open the car windows to cool the interior of the automobile or to heat the interior of the automobile using outside air.

However, in recent times, many vehicle passengers have become reluctant to open the window of the car because they do not want items located outside the car to flow into the car via the open window. These items include dust, debris, insects, and the like. Because of this reluctance, some car owners use air conditioning and others simply endure the discomfort of the closed vehicle. Air conditioning not only prevents enjoyment of fresh air, it may be wasteful of gasoline since the vehicle may be less efficient when an air conditioning system is being used.

Therefore, an occupant of a motor vehicle is often faced with a choice of enduring less than ideal environmental conditions or enduring the discomforts associated with an open window.

Therefore, there is a need for a device that can allow a vehicle occupant to enjoy the advantages associated with fresh air without enduring the disadvantages associated with an open vehicle window.

While there are many window screens that can be used on motor vehicles, all of the known window screens have certain disadvantages that prevent the full acceptance and use of such known screens.

For example, most window openings in motor vehicles are not perfectly planar and may have several curvatures. A planar window screen thus may not produce a fit between the screen and the automobile that is secure enough to fully protect the interior of the vehicle from entry by undesired items.

Still further, many known window screens used on motor vehicles cannot be stored in a manner that keeps the screen totally out of the way when the screen is not in use. This may interfere with the operation of the automobile or produce an unsightly and annoying item inside the vehicle.

Still further, many known window screens are difficult or cumbersome to install. Some of these screens require a person to orient the screen over the window opening, attach the screen to a substrate, and then reverse the process to remove the screen. This is cumbersome and may inhibit the use of such screens, especially if the user is not adept or coordinated.

Still further, some known screens are not easily placed on existing vehicles. That is, the vehicle cannot be easily retrofit to have such a screen. A vehicle owner may have to use the services of a skilled mechanic to install such known window screens.

Some known window screens are not securely held in place once located over the window opening. This may create leak paths for unwanted debris or insects to enter the interior of the vehicle and thus defeat the advantages of the window screen. If a person knows that unwanted debris or insects may bypass the window screen and that screen is somewhat difficult or inconvenient to use, that person is quite likely to avoid using the window screen thereby vitiating or totally defeating the advantages associated with such a screen.

Still further, some known screens are difficult to clean. This is especially true if the screen is permanently attached to the vehicle. Since the screen is exposed to debris and insects when in use, it is quite likely that the screen will need a thorough washing once in awhile. Once a screen becomes dirty, not only is its aesthetic appeal affected, its effectiveness is also affected. If a screen is dirty a user is likely to avoid using that screen again defeating the advantages of the screen.

Still further, many known window screens are expensive to purchase and/or to install. In either situation, a person is likely to avoid the screen, especially if the screen has any or all of the disadvantages discussed above.

Therefore, there is a need for a window screen assembly for use on an automobile, or other such vehicle, that overcomes the disadvantages of the prior art yet is easy and inexpensive to install, use and maintain.

PRINCIPAL OBJECTS OF THE INVENTION

It is main object of the present invention to provide a window screen assembly for a vehicle that can be easily stored and deployed when desired.

It is another object of the present invention to provide a window screen assembly for a vehicle that can fit snugly about a window opening of the vehicle when the screen is in place.

It is another object of the present invention to provide a window screen assembly that is easily cleaned.

It is another object of the present invention to provide a window screen assembly for a vehicle that is durable.

It is another object of the present invention to provide a window screen assembly for a vehicle that is out of the way when stored.

It is another object of the present invention to provide a window screen assembly for a vehicle that is securely held in place when being used to cover the window of an automobile.

It is another object of the present invention to provide a window screen assembly for a vehicle that is easily retrofit onto existing automobiles.

It is another object of the present invention to provide an inexpensive window screen assembly for a vehicle.

SUMMARY OF THE INVENTION

These, and other, objects are achieved by a window screen assembly that includes a flexible body stored in a hollow cylindrical housing adjacent to the bottom edge of a window opening and which includes hook-and-loop fasteners that releasably attach the flexible body of the window screen to the vehicle adjacent to the window frame. The flexible body is stored in the cylindrical housing when not in use, and is easily pulled out of the housing and releasably attached to the vehicle when desired. The flexible nature of the screen permits the screen to closely conform to the shape of the window opening whereby a secure attachment is effected.

The housing is easily mounted on the vehicle adjacent to the window opening whereby a retrofit can be easily effected.

Thus, the window screen assembly embodying the present invention is inexpensive, easy to install and maintain, yet is secure and effective when in use and unobtrusive when not in use.

BRIEF DESCRIPTION OF THE DRAWINGS

FIG. 1 is a perspective view of the window screen assembly embodying the present invention.

FIG. 2 is view of the flexible body of the screen included in the window screen assembly embodying the present invention.

FIG. 3 is an elevational view of the screen of the window screen assembly indicating the curvature that the screen can establish.

FIG. 4 is a partial view of a storage unit that is used to store the window screen when the screen is not in use.

DETAILED DESCRIPTION OF THE INVENTION

Other objects, features and advantages of the invention will become apparent from a consideration of the following detailed description and the accompanying drawings.

The window screen assembly embodying the present invention is easily stored adjacent to a window yet is easily deployed, and when deployed will be securely held in place and will securely cover the window while permitting air to circulate into and out of the interior of the automobile and while also keeping unwanted objects and debris from entering the interior of the vehicle.

Referring to the accompanying figures, it can be seen that the present invention is embodied in a window screen assembly 10 that can be used on an automobile, truck, or other such vehicle. Assembly 10 comprises a vehicle window frame 12 that is only partially shown in FIG. 1 for the sake of ease of disclosure. Window frame 12 has a top edge 14, a bottom edge 16, a first side edge 18, and a second side edge 20. A longitudinal axis 22 extends between top edge 14 and bottom edge 16 and a transverse axis 24 extends between first side edge 18 and second side edge 20. A window opening 26 is defined in window frame 12 and has a length dimension 28 extending along longitudinal axis 22 from top edge 14 of vehicle window frame 12 to bottom edge 16 of automobile window frame 12 and a width dimension 30 which extends along transverse axis 24 from first side edge 18 of vehicle window frame 12 to second side edge 20 of vehicle window frame 12. A planar window, shown schematically in FIG. 1 and designated by the numeral 32, is attached to window frame 12 and has a plane 34 containing the planar window 32.

As discussed above, many automobiles have a curved interior surface adjacent to the window. This curved surface may curve in several different planes.

The window screen assembly 10 of the present invention further includes a storage unit 40 which includes a hollow cylindrical housing 42 having a tubular wall 44, a first end 46, a second end 48, a first end cap 50 on first end 46, a second end cap 52 on second end 48 and a longitudinal axis 54 extending between first end 46 and second end 48. A slot 56 is defined in tubular wall 44 of cylindrical housing 42 and extends from first end 46 of hollow cylindrical housing 42 to second end 48 of hollow cylindrical housing 42 and extends along longitudinal axis 54 of cylindrical housing 42. Housing 42 further includes an outer surface 58 and an interior volume 60 defined by tubular wall 44 of housing 42.

Mounting brackets, such as mounting bracket 70, are fixedly attached to outer surface 58 of tubular wall 44 of housing 42 at locations that are spaced apart from each other along longitudinal axis 54 of hollow cylindrical housing 42. Each mounting bracket 70 includes an arcuate body 72 fixed to outer surface 58 of tubular wall 44 of housing 42 and a proximal end fixed to the window frame 12 adjacent to bottom edge 16 of the vehicle window frame 12. Brackets 70 can be plastic or metal or any other suitable material and can be fixed to the vehicle by adhesive, fasteners or the like. Bracket attachment elements are well known in the vehicle art and thus will not be further discussed.

Hollow cylindrical housing 42 is mounted on window frame 12 adjacent to bottom edge 16 of the window frame 12 and is oriented to have longitudinal axis 54 of the hollow cylindrical housing 42 extending along width dimension 30 of window opening 26 in window frame 12 and has slot 56 of the hollow cylindrical housing 42 located adjacent to window opening 30 in the window frame 12.

Window screen assembly 10 further includes a screen 80 which includes a flexible body 82 which can be made of plastic material or cloth material or the like, a top edge 84 of flexible body 82, a first side edge 86 of flexible body 82 of screen 80, a second side edge 88 of flexible body 82 of screen 80 and a bottom edge 89 of flexible body 82 of screen 80. Top edge 84 of the flexible body 82 of the screen 80 is flexible to be shaped to correspond to the shape of top edge 14 of window frame 12 when screen 80 is in place covering window opening 26 in window frame 12. First side edge 86 of flexible body 82 of the screen 80 is flexible to be shaped to correspond to the shape of first side edge 18 of window frame 12 when the screen 80 is in place covering window opening 26 in the window frame 12. Second side edge 88 of the flexible body 82 of the screen 80 is flexible to be shaped to correspond to the shape of second side edge 20 of window frame 12 when screen 80 is in place covering window opening 26 in the window frame 12. As can be seen in FIG. 1, one or more of the side edges of the window frame 12 can be a compound curve. The flexible nature of window screen 80 permits screen 80 to be easily shaped to correspond to the perimeter shape of the window opening 26. As will be understood from the disclosure of this invention, the screen 80 can also be easily cut to a shape that corresponds to the size and shape of the perimeter of the window opening 26.

The body of screen 80 is flexible to be shaped to cover the window opening 26 in the window frame 12 when the screen 80 is in place covering the window opening 26 even if the perimeter of the window frame 12 is curved in several different planes. The curved nature of window screen 80 embodying the present invention is indicated in FIG. 3 and the curved nature of the perimeter of the flexible body 82 of the window screen 80 is indicated in FIG. 2, and the compound nature of the shape of one or more of the side edges of the window screen 80 of the present invention is indicated in FIG. 1. It can be understood from the present disclosure, including the disclosure of these figures, that the flexible nature of the screen 80 of the present invention permits the screen 80 to be easily adapted to a wide variety of shapes and sizes of windows while still effecting a secure fit between the screen 80 and the window frame 12.

Window screen assembly 12 further includes first hook-and-loop fastener material 90 on top edge 14 of window frame 12 adjacent to opening 26 in window frame 12, second hook-and-loop fastener material 92 on first side edge 18 of window frame 12 adjacent to opening 26 in window frame 12, and third hook-and-loop fastener material 94 on second side edge 20 of window frame 12 adjacent to opening 26 in window frame 12. The hook-and-loop materials are shown as being in separate units; however, in some forms of the invention, the hook-and-loop materials can be one continuous strip that covers both of the side edges 18 and 20 of the window frame 12 as well as the top edge 14 of the window frame 12 from bottom edge 16 adjacent to first side edge 18 over first side edge 18, top edge 14 and second side edge 20 back to bottom edge 16 adjacent to second side edge 20. This form of the invention is indicated in FIG. 2 wherein a single, continuous strip 101 of hook-and-loop fastener material is indicated. Window screen assembly 10 further includes fourth hook-and-loop fastener material 100 on top edge 84 of flexible body 82 of screen 80 and which is located to releasably engage first hook-and-loop fastener material 90 on top edge 14 of window frame 12 when screen 80 is in place covering window opening 26 in window frame 12, fifth hook-and-loop fastener material 102 on first side edge 86 of flexible body 82 of screen 80 and which is located to releasably engage second hook-and-loop fastener material 92 on first side edge 18 of window frame 12 when screen 80 is in place covering the window opening 26 in the window frame 12, sixth hook-and-loop fastener material 104 on second side edge 88 of flexible body 82 of screen 80 and which is located to releasably engage third hook-and-loop fastener material 94 on second edge 20 of window frame 12 when screen 80 is in place covering window opening 26 in window frame 12.

Window screen assembly 10 further includes a roller 110 in hollow cylindrical housing 42 and which extends from first end 46 of hollow cylindrical housing 42 to second end 48 of hollow cylindrical housing 42. Roller 110 is rotatably mounted on the hollow cylindrical housing 42 to rotate about longitudinal axis 54 of the hollow cylindrical housing 42. Bottom edge 88 of flexible body 82 of screen 80 is fixedly secured to roller 110 so the flexible body is wound onto the roller and unwound from the roller as the roller rotates about longitudinal axis 54. This permits the flexible body 82 to move through slot 56 between a stored condition inside the hollow cylindrical housing 42 and a deployed condition outside of the hollow cylindrical housing 42. A spring mechanism 112 connects roller 110 to hollow cylindrical housing 42 and is biased to roll the screen 80 up onto the roller 110. A lock mechanism 114 keeps the screen 80 deployed when desired. The spring mechanism 112 and the lock mechanism 114 as well as the details of the mounting of the screen 80 onto the roller 110 and the roller 110 on the housing 42 will not be presented as those skilled in the art of window screens will understand what elements and the association of those elements will be required to carry out the functions discussed above in regard to the invention.

It is understood that while certain forms of the present invention have been illustrated and described herein, it is not to be limited to the specific forms or arrangements of parts described and shown.

We claim:

1. A window screen assembly for a vehicle comprising:
a) a vehicle window frame having
   (1) a top edge,
   (2) a bottom edge,
   (3) a first side edge,
   (4) a second side edge,
   (5) a longitudinal axis extending between the top edge and the bottom edge,
   (6) a transverse axis extending between the first side edge and the second side edge,
   (7) a window opening in said window frame having a length dimension extending along the longitudinal axis from the top edge of said vehicle window frame to the bottom edge of said vehicle window frame and a width dimension extending along the transverse axis from the first side edge of said vehicle window frame to the second side edge of said vehicle window frame,
   (8) a planar window attached to said window frame and having a plane containing the planar window, and
   (9) at least one of the top edge, the bottom edge, first side edge and second side edge curving with respect to the plane containing the window;
b) a storage unit which includes
   (1) a hollow cylindrical housing having
      (A) a tubular wall,
      (B) a first end,
      (C) a second end,
      (D) a first end cap on the first end,
      (E) a second end cap on the second end,
      (F) a longitudinal axis extending between the first end of said hollow cylindrical housing and the second end of said hollow cylindrical housing,
      (G) a slot defined in the tubular wall of the hollow cylindrical housing of said storage unit to extend from the first end of the hollow cylindrical housing to the second end of the hollow cylindrical housing and to extend along the longitudinal axis of the cylindrical housing,
      (H) an outer surface of the tubular wall, and
      (I) an interior volume defined by the tubular wall of the housing,
   (2) mounting brackets fixedly attached to the outer surface of the tubular wall of the housing at locations that are spaced apart from each other along the longitudinal axis of the hollow cylindrical housing, each mounting bracket including
      (A) an arcuate body fixed to the outer surface of the tubular wall of said housing, and
      (B) a proximal end fixed to the window frame adjacent to the bottom edge of said vehicle window frame, and
   (3) the hollow cylindrical housing being mounted on said window frame adjacent to the bottom edge of said window frame and oriented to have the longitudinal axis of the hollow cylindrical housing extending along the width dimension of the window opening in said window frame and the slot of the hollow cylindrical housing located adjacent to the window opening in said window frame;
c) a screen including
   (1) a flexible body,
   (2) a top edge of the flexible body of said screen,
   (3) a first side edge of the flexible body of said screen,
   (4) a second side edge of the flexible body of said screen,
   (5) a bottom edge of the flexible body of said screen,
   (6) the top edge of the flexible body of said screen being flexible to be shaped to correspond to the shape of the top edge of said window frame when said screen is in place covering the window opening in said window frame,
   (7) the first side edge of the flexible body of said screen being flexible to be shaped to correspond to the shape of the first side edge of said window frame when said screen is in place covering the window opening in said window frame,
   (8) the second side edge of the flexible body of said screen being flexible to be shaped to correspond to the shape of the second side edge of said window frame when said screen is in place covering the window opening in said window frame, (9) the body of said screen being flexible to be shaped to cover the window opening in said window frame when said screen is in place covering the window opening in said window frame, d) first hook-and-loop fastener material on the top edge of said window frame adjacent to the opening in said window frame;

e) second hook-and-loop fastener material on the first side edge of said window frame adjacent to the opening in said window frame;

f) third hook-and-loop fastener material on the second side edge of said window frame adjacent to the opening in said window frame;

g) fourth hook-and-loop fastener material on the top edge of the flexible body of said screen and located to releasably engage said first hook-and-loop fastener material on the top edge of said window frame when said screen is in place covering the window opening in said window frame;

h) fifth hook-and-loop fastener material on the first side edge of the flexible body of said screen and being located to releasably engage the second hook-and-loop fastener material on the first side edge of said window frame when said screen is in place covering the window opening in said window frame;

i) sixth hook-and-loop fastener material on the second side edge of the flexible body of said screen and being located to releasably engage the third hook-and-loop fastener material on the second edge of said window frame when said screen is in place covering the window opening in said window frame;

j) a roller in the hollow cylindrical housing and extending from the first end of the hollow cylindrical housing to the second end of the hollow cylindrical housing, said roller being rotatably mounted on the hollow cylindrical housing to rotate about the longitudinal axis of the hollow cylindrical housing;

k) the bottom edge of the flexible body of said screen being fixedly secured to said roller;

l) the flexible body of said screen extending through the slot defined in said hollow cylindrical housing; and m) a spring mechanism connecting said roller to said hollow cylindrical housing; and wherein said first through sixth hook-and-loop fastener materials are structured to effect a secure fit between the screen and the window frame to thereby permit air to circulate into and out of the interior of the automobile through the screen while keeping unwanted objects and debris from entering the interior of the vehicle.

2. The window screen assembly as described in claim 1 wherein the flexible body of said screen is plastic material.

3. The window screen assembly as described in claim 1 wherein the flexible body of said screen is fabric material.

4. The window screen assembly as described in claim 1 wherein said first hook-and-loop fastener material, said second hook-and-loop fastener material, and said third hook-and-loop fastener material connect together and form a single continuous strip of hook-and-loop fastener material adjacent to the window opening in said window frame.

5. The window screen assembly as described in claim 4 wherein said fourth hook-and-loop fastener material, said fifth hook-and-loop fastener material, and said sixth hook-and-loop fastener material, connect together and form a single continuous strip of hook-and-loop fastener material on the flexible body of said screen.

* * * * *